US012018578B1

(12) United States Patent
Schafer et al.

(10) Patent No.: US 12,018,578 B1
(45) Date of Patent: Jun. 25, 2024

(54) CORE TURNING SYSTEM

(71) Applicant: RTX Corporation, Farmington, CT (US)

(72) Inventors: Bradley C. Schafer, Ellington, CT (US); Brian V. Winebrenner, Vernon, CT (US); Jason B. Solomonides, Cromwell, CT (US); Marc J. Muldoon, Marlborough, CT (US); John P. Virtue, Jr., Middletown, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/299,423

(22) Filed: Apr. 12, 2023

(51) Int. Cl.
*F01D 25/36* (2006.01)
*F01D 21/04* (2006.01)

(52) U.S. Cl.
CPC ............. *F01D 25/36* (2013.01); *F01D 21/04* (2013.01); *F05D 2270/114* (2013.01)

(58) Field of Classification Search
CPC ............. F05D 2220/36; F05D 2220/32; F05D 2270/114; F05D 2270/02; F01D 21/00; F01D 21/20; F01D 19/02; F01D 25/34
See application file for complete search history.

(56) References Cited

U.S. PATENT DOCUMENTS 10,443,543 B2 10/2019 Virtue, Jr. et al.
10,473,034 B2 11/2019 Harder et al.
10,502,139 B2 12/2019 Ross et al.
10,598,047 B2 3/2020 Clauson et al.
10,781,754 B2 * 9/2020 Chiasson .................. F02C 7/26
10,801,371 B2 10/2020 Clauson et al.
11,486,310 B2 * 11/2022 Tomescu ................. F02C 7/268
2009/0037121 A1 * 2/2009 Muralidharan ....... F01D 25/285 73/462
2017/0234231 A1 * 8/2017 Virtue, Jr. ............... F01D 25/34 416/1
2017/0363012 A1 * 12/2017 Clauson .................. F02C 7/275
2018/0340475 A1 11/2018 Grigorov et al.
2019/0178165 A1 * 6/2019 Chiasson ................ F01D 25/34
2019/0186368 A1 * 6/2019 Sharma ..................... F02C 7/06
2020/0271011 A1 * 8/2020 Comandore ............ F01D 19/02
2022/0235707 A1 * 7/2022 Millhaem ............... F01D 25/12

* cited by examiner

*Primary Examiner* — Anthony Ayala Delgado
(74) *Attorney, Agent, or Firm* — CANTOR COLBURN LLP

(57) ABSTRACT

A bowed rotor prevention system includes a gas turbine engine, and electric motor, and a core turning controller. The gas turbine engine includes a rotor that is rotatably coupled to a drive shaft. The electric motor is rotatably coupled to a motor shaft, which is mechanically coupled to the drive shaft so as to rotate therewith. The core turning controller in signal communication with the electric motor. The core turning controller determines whether a rotor bow is present in the rotor based on an operating time of the gas turbine engine, determines a motoring time based on the operating time, and invokes an anti-rotor bowing mode configured to control the electric motor to rotate the rotor according to the motor time.

17 Claims, 4 Drawing Sheets

CORE TURNING SYSTEM

BACKGROUND

This disclosure relates generally to gas turbine engines, and more particularly, to a system and method for removing rotor bowing in a gas turbine engine.

When turbine engines are shut down after operation, the retained heat in the core rises and creates a bow in the turbine rotor and engine case. The bowing phenomenon is referred to as "rotor bowing" or "thermal bowing." If the engine is restarted before it has thermally stabilized and the rotor bowing is not removed, the bowed rotor(s) can rub against the static seals. As a result, the seal material can be worn down or entirely removed, which can compromise compressor stability. In a worst-case scenario, the rotor can rub sufficiently deep into the static seal and cause an engine stall.

BRIEF DESCRIPTION

According to a non-limiting embodiment, a bowed rotor prevention system includes a gas turbine engine, and electric motor, and a core turning controller. The gas turbine engine includes a rotor that is rotatably coupled to a drive shaft. The electric motor is rotatably coupled to a motor shaft, which is mechanically coupled to the drive shaft so as to rotate therewith. The core turning controller in signal communication with the electric motor. The core turning controller determines whether a rotor bow is present in the rotor based on an operating time of the gas turbine engine, determines a motoring time based on the operating time, and invokes an anti-rotor bowing mode configured to control the electric motor to rotate the rotor according to the motor time.

In addition to one or more of the features described above, or as an alternative to any of the foregoing embodiments, in response to invoking the anti-rotor bowing mode, the core turning controller is configured to perform one of a first anti-bowing technique to prevent the rotor bow from forming in the rotor, or a second anti-bowing technique that removes the rotor bow present in the rotor.

In addition to one or more of the features described above, or as an alternative to any of the foregoing embodiments, the first anti-bowing technique includes determining a most recent operating time of the gas turbine engine, and calculating the motoring time which is indicative of an amount of time during which the rotor is rotated to prevent the rotor bow from forming.

In addition to one or more of the features described above, or as an alternative to any of the foregoing embodiments, the core turning controller divides a full rotation of the rotor into a number of equal steps and controls the motor such that it rotates the rotor through an alternating series of rotations and pauses over the full rotation.

In addition to one or more of the features described above, or as an alternative to any of the foregoing embodiments, a time clock unit in signal communication with the core turning controller and configured to monitor the motoring time and to output a timing signal indicative of the motoring time.

In addition to one or more of the features described above, or as an alternative to any of the foregoing embodiments, the core turning controller is configured to deactivate the electric motor in response to the timing signal indicating that the motoring time is expired.

In addition to one or more of the features described above, or as an alternative to any of the foregoing embodiments, the core turning controller initiates engine startup of the gas turbine engine in response to determining the motoring time is expired.

In addition to one or more of the features described above, or as an alternative to any of the foregoing embodiments, the core turning controller performs the second anti-bowing technique in response to a deactivation of the core turning motor before the motoring time expires.

In addition to one or more of the features described above, or as an alternative to any of the foregoing embodiments, the second anti-bowing technique includes calculating, by the core turning controller, an additional amount of rotor bow that forms in the rotor during a motoring down-time caused by the incomplete anti-rotor bowing operation, and calculates a new motoring time at which to motor the rotor to remove the bow having the additional amount of rotor bow.

In addition to one or more of the features described above, or as an alternative to any of the foregoing embodiments, the core turning controller detects a fault in the anti-rotor bowing mode, and invokes a backup rotor turning system to remove the bow having the additional amount of rotor bow.

In addition to one or more of the features described above, or as an alternative to any of the foregoing embodiments, the backup rotor turning system is configured to rotate the rotor at a constant rotation according to the new motoring time to remove the bow having the additional amount of rotor bow.

According to another non-limiting embodiment, a method of operating a rotor of an aircraft is provided. The method includes rotating a rotor of a gas turbine engine, and rotating a motor shaft using an electric motor. The motor shaft is coupled to a drive shaft of the rotor such that rotating the motor shaft rotates the rotor. The method further includes determining, by a core turning controller, whether a rotor bow is present in the rotor based on an operating time of the gas turbine engine, and determining a motoring time based on the operating time. The method further includes invoking, by the core turning controller, an anti-rotor bowing mode configured to control the electric motor to rotate the rotor according to the motor time.

In addition to one or more of the features described above, or as an alternative to any of the foregoing embodiments, in response to invoking the anti-rotor bowing mode, the core turning controller is configured to perform one of a first anti-bowing technique to prevent the rotor bow from forming in the rotor, or a second anti-bowing technique that removes the rotor bow present in the rotor.

In addition to one or more of the features described above, or as an alternative to any of the foregoing embodiments, the first anti-bowing technique further comprises: determining, by the core turning controller, a most recent operating time of the gas turbine engine; and calculating, by the core turning controller, the motoring time which is indicative of an amount of time during which the rotor is rotated to prevent the rotor bow from forming.

In addition to one or more of the features described above, or as an alternative to any of the foregoing embodiments, the first anti-bowing technique further comprises: dividing, by the core turning controller, a full rotation of the rotor into a number of equal steps; and controlling the motor such that it rotates the rotor through an alternating series of rotations and pauses over the full rotation.

In addition to one or more of the features described above, or as an alternative to any of the foregoing embodiments, the method includes monitoring, by a time clock unit, the motoring time and to output a timing signal indicative of the motoring time.

In addition to one or more of the features described above, or as an alternative to any of the foregoing embodiments, the method includes deactivating the electric motor in response to the timing signal indicating that the motoring time is expired.

In addition to one or more of the features described above, or as an alternative to any of the foregoing embodiments, the method includes initiating engine startup of the gas turbine engine in response to determining the motoring time is expired.

In addition to one or more of the features described above, or as an alternative to any of the foregoing embodiments, the core turning controller performs the second anti-bowing technique in response to a deactivation of the core turning motor before the motoring time expires. The second anti-bowing technique comprises: calculating, by the core turning controller, an additional amount of rotor bow that forms in the rotor during a motoring down-time caused by the incomplete anti-rotor bowing operation; and calculating, by the core turning controller, a new motoring time at which to motor the rotor to remove the bow having the additional amount of rotor bow.

In addition to one or more of the features described above, or as an alternative to any of the foregoing embodiments, the method further includes: detecting, by the core turning controller, a fault in the anti-rotor bowing mode; invoking a backup rotor turning system; and rotating, by the backup rotor turning system, the rotor at a constant rotation according to the new motoring time to remove the bow having the additional amount of rotor bow.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Known turbine rotor and engine case bow removal techniques involve rotating the rotor prior to starting for a minute up to several minutes in order to remove most of the bow. However, this pre-start rotation operation (sometimes referred to as "motoring") adds time to the overall aircraft starting process, which delays flight times and impacts customer operating logistics. Known pre-start rotation techniques also do not actively control and manage the rotation of the rotor in a manner that achieves optimal rotational angles to ensure the removal of a bowed rotor in the quickest time possible.

One or more non-limiting embodiments of the present disclosure provides a bowed rotor prevention system configured to optimally remove, or even fully prevent, rotor bow that can occur in a gas turbine engine. The bowed rotor prevention system includes a core turning controller configured to determine an operating time of the engine, determine an amount of bow present in the rotor based on the engine operating time, and determine a motoring time indicative of an amount of time needed to motor (e.g., turn) the rotor so that the bow is removed. Based on the motoring time, the core turning controller can activate a motor controller that drives a core turning motor to turn the rotor for the duration of the motoring time to ensure a thermal bow is removed from the rotor. Once the motoring time expires, the motor can be deactivated and engine startup can be initiated.

Figure 1:
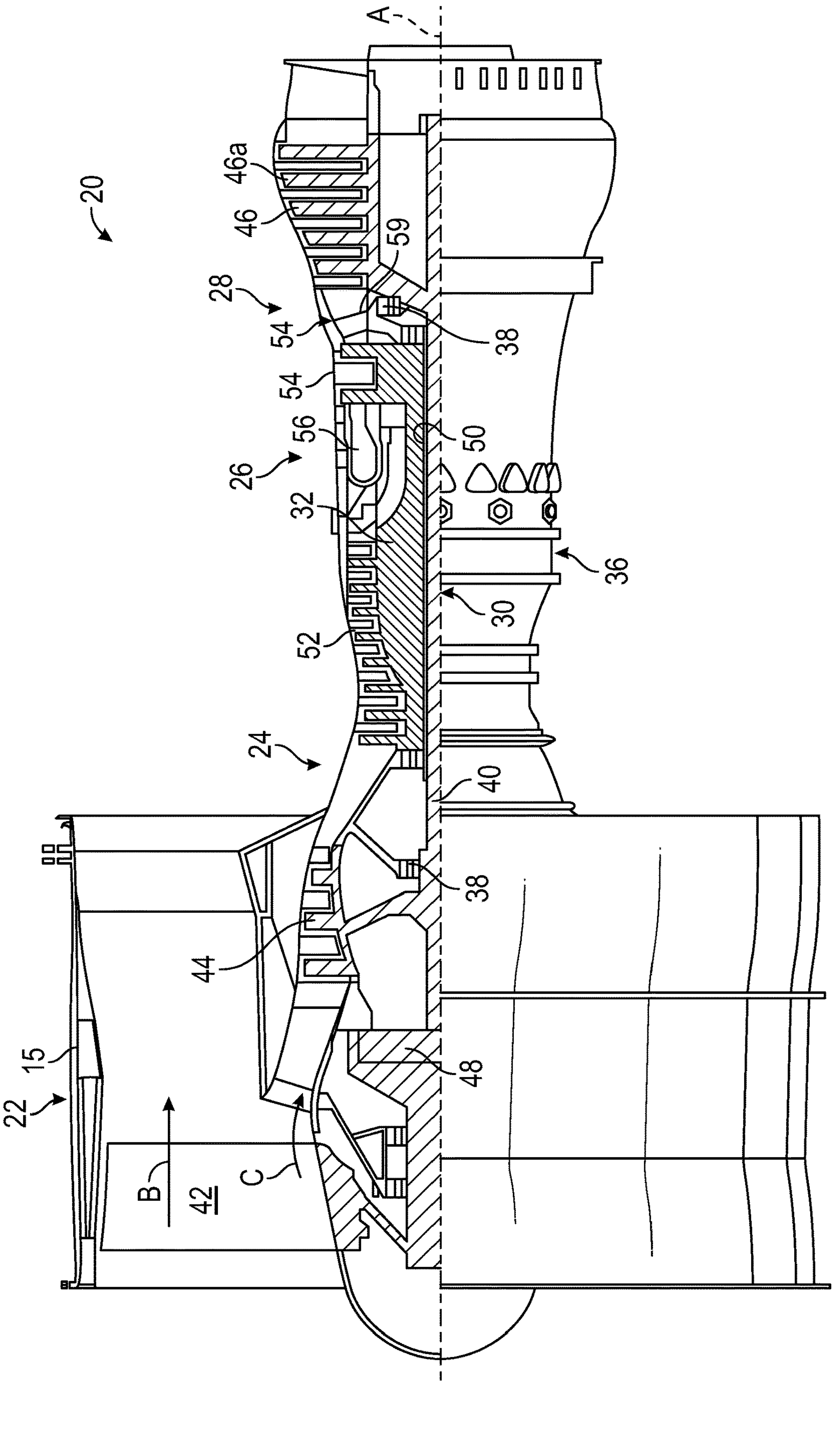
FIG. 1 is a schematic, partial cross-sectional view of a gas turbine engine in accordance with this disclosure.

With reference now to FIG. 1, a gas turbine engine 20 is schematically illustrated according to a non-limiting embodiment of the present disclosure. The gas turbine engine 20 is disclosed herein as a two-spool turbofan (e.g., an air turbine assembly) that generally incorporates a fan section 22, a compressor section 24, a combustor section 26 and a turbine section 28. Alternative engines might include other systems or features. In one or more non-limiting embodiments, the gas turbine engine 20 is implemented as a turbo-generator or motor-generator such that the gas turbine engine 20 is coupled with an electrically powered motor-generator. In one or more non-limiting embodiments, the turbo-generator is implemented as a gas turbine engine 20 which couples the turbo-generator to a spool (e.g., high speed spool, low speed spool, etc.). In some examples, the turbo-generator may include two or more motor generators, each motor-generator connected to a different spool (e.g., a first motor-generator coupled to a high speed spool and a second motor-generator coupled to a low speed spool.

The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally implements a spool assembly, which includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 (e.g. geared architecture) may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

In one non-limiting example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at **46*a*. In a further non-limiting example the low pressure turbine 46 includes about 3 turbine rotors. A ratio between the number of blades of the fan 42 and the number of low pressure turbine rotors 46*a* is between about 3.3 and about 8.6. The example low pressure turbine 46 provides the driving power to rotate the fan section 22 and therefore the relationship between the number of turbine rotors 46*a* in the low pressure turbine 46 and the number of blades in the fan section 22 discloses an example gas turbine engine 20** with increased power transfer efficiency.

Figure 2:
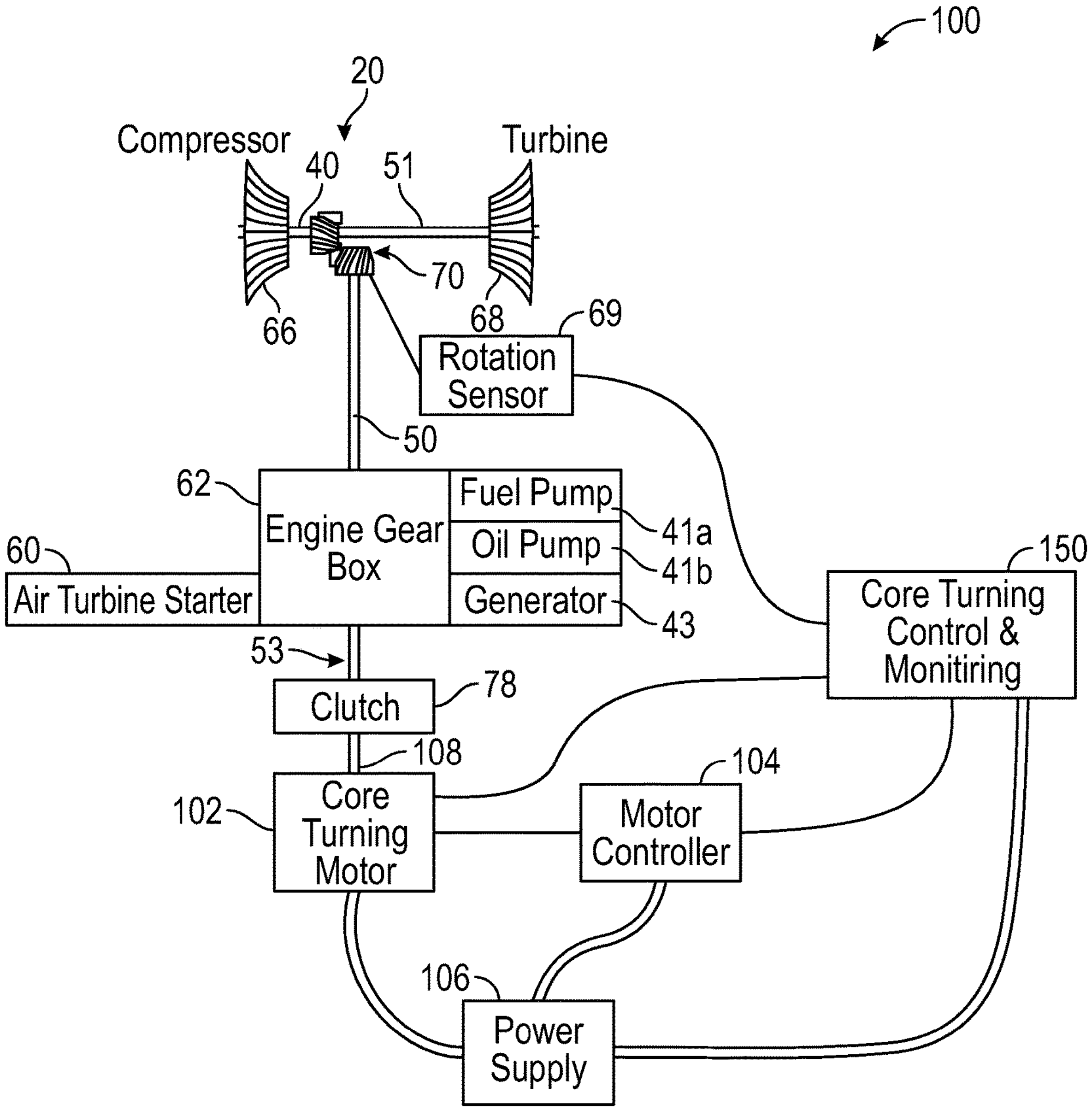
FIG. 2 is a diagram depicting a bowed rotor prevention system according to a non-limiting embodiment of the present disclosure.

Turning now to FIG. 2, a block diagram of the bowed rotor prevention system 100 according to an embodiment. In the example of FIG. 2, the bowed rotor prevention system 100 is configured to reduce, or even prevent, turbine rotor bow and/or engine case bow from occurring in a gas turbine engine 20. According to a non-limiting embodiment, the gas turbine engine 20 includes an air compressor 66 coupled to a turbine 68 via a spool shaft 51. The bowed rotor prevention system 100 includes a core turning motor 102, a controller 104, and a power supply 106. The core turning motor 102 is mechanically coupled to the gas turbine engine 20. In one or more non-limiting embodiments, the gas turbine engine 20 is mechanically coupled to the core turning motor via an air turbine starter assembly 60. Although the bowed rotor prevention system 100 is described herein with respect to a gas turbine engine 20 (such as the gas turbine engine 20 shown in FIG. 20), it should be appreciated that the bowed rotor prevention system 100 can operate in conjunction with other types of aircraft propulsion system. For example, the bowed rotor prevention system 100 can be implemented in a hybrid-electric propulsion (HEP) system without departing from the scope of the present disclosure.

The core turning motor 102 is an electric motor that drives a motor shaft 108 responsive to an electric current from the power supply 106. According to a non-limiting embodiment, the core turning motor 102 is mechanically coupled to the engine gear box 62 via a core turning drive shaft 53. In alternate embodiments, the core turning motor 102 can be mechanically coupled to the engine gear box 62 through an air turbine starter 60 or other components coupled to the engine gear box 62. In an embodiment, the bowed rotor prevention motor 102 is incapable of driving rotation of the gas turbine engine 20 of FIG. 1 at a sufficient speed to start combustion within the gas turbine engine 20. In an embodiment, the bowed rotor prevention motor 102 drives rotation of the gas turbine engine 20 at less than 1000 RPM and may be incapable of producing sufficient horsepower to reach higher speeds when driving engine rotation. The controller 104 is operable to control a flow of electric current from the power supply 106 to the bowed rotor prevention motor 102. The controller 104 is operable to engage the bowed rotor prevention motor 102 based on detecting an engine shutdown condition of the gas turbine engine 20 of FIG. 1.

Although the bowed rotor prevention system 100 of FIG. 2 shows the core turning motor 102 as a dedicated motor for turning the rotor of the gas turbine engine 20, the bowed rotor prevention system 100 can be implemented in a hybrid-engine propulsion system such that a rotor is turned using a motor that also serves to drive the hybrid electric propulsors/fans. In this embodiment, a separate clutch system or gear differential (not shown) can be implemented which selectively operates the motor to turn a rotor (e.g., during an anti-rotor bowing mode) to reduce thermal bowing in a rotor or during normal propulsion mode to drive the hybrid electric propulsors/fans.

In one or more non-limiting embodiments, the controller 104 can receive a motor control signal (e.g., from a FADEC or a core turning controller). Alternatively, the motor control signal may be received from another source, such as a sensor, an aircraft communication bus, a discrete switch, or the like. The controller 104 can use a power supply interface to control the flow of electric current on one or more power supply lines between the power supply 106 and the bowed rotor prevention motor 102. The flow of electric current can be controlled using one or more switching elements, such as relays, (not depicted) through the power supply interface. The power supply interface may also enable the controller 104 to monitor the power supply 106 and/or back electromotive force of the bowed rotor prevention motor 102.

The controller 104 may include memory to store instructions that are executed by a processor. The executable instructions may be stored or organized in any manner and at any level of abstraction, such as in connection with a controlling and/or monitoring operation of one or more systems of the gas turbine engine 20 of FIG. 1. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The controller 104 can be embodied in an individual line-replaceable unit, within a control system (e.g., in an electronic engine control), and/or distributed between multiple electronic systems.

In the example of FIG. 2, the core turning drive shaft 53 is mechanically linked to the engine gear box 102. The engine gear box 102 mechanically links to the spool shaft 50 via a gear interface 70. According to a non-limiting embodiment, a gear interface 70 mechanically couples an output shaft 40 (e.g., an inner shaft) to a drive shaft 50 and the spool shaft 51. The clutch 78 facilitates selective engagement and disengagement of the bowed rotor prevention motor 102 to the gas turbine engine 20. Accordingly, the clutch 78 can be operated to invoke different operating modes including, but not limited to, an anti-rotor bowing mode, a maintenance operation mode and an engine start operation mode.

The drive shaft 50 is coupled to an engine gear box 62. The gear interface 70 translates rotational motion of the output shaft 40 and the spool shaft 51 to the drive shaft 50. Likewise, the gear interface 70 translates rotational motion of the drive shaft 50 (e.g., in response to rotating the motor shaft 108) to the output shaft 40 and the spool shaft 51. While a specific configuration of the gear interface 70 is depicted in FIG. 2, other configurations are contemplated within the scope of embodiments.

With continued reference to FIG. 2, it should be appreciated that other control aspects related to the bowed rotor prevention system 100 can be managed by the core turning controller 150 and/or other controllers, such as a full authority digital engine control (FADEC). According to a non-limiting embodiment, the motor controller 104 is provided to control the speed of core turning motor 102. For example, the core turning controller 150 may disengage the bowed rotor prevention motor 102, e.g., disable power through the power supply interface 112, based on receiving a maintenance request to prevent the bowed rotor prevention motor 102 from driving rotation of the motor shaft 108 when a maintenance operation will be performed. Although the motor controller 104 and the core turning controller 150 are shown to be separate items, these functions could be contained in a single item. Further control aspects can include disengaging one or more hydraulic pumps such as, for example, a fuel pump 41*a*, an oil pump 41*b*, etc.) and one or more electric generators 43 coupled to the engine gear box 62 when the bowed rotor prevention motor 102 is commanded to turn the motor shaft 108.

According to a non-limiting embedment, one or more rotational sensors 69 are configured to output a rotational signal indicating a rotational rotor speed and/or rotor position of the compressor/turbine rotor (e.g., included in the air turbine assembly 66) and/or rotation of the turbine 68. In this manner, the core turning controller 150 can determine the rotational position/speed of the rotor. In one or more embodiments, the core turning controller 150 can utilize the rotational signal to set the rotor position at defined locations at set intervals rather than continually rotate the rotor so as to minimize energy use. In other words, the core turning controller 150 can determine a full rotation of the rotor and divide the rotation in a number of equal steps or intervals. Accordingly, the core turning controller 150 can control the motor controller 104, which in turn can operate the motor 102 as a stepper motor such that it steps the rotation of the rotor through an alternating series of rotations and pauses while motoring the rotor over its full rotation. In at least one embodiment, a first rotational sensor is coupled to a first gear and a second rotational sensor is coupled to a second gear. Providing two sensors on different gears allows for redundancy and ensures that rotation is confirmed even with one failed sensor.

Figure 3:
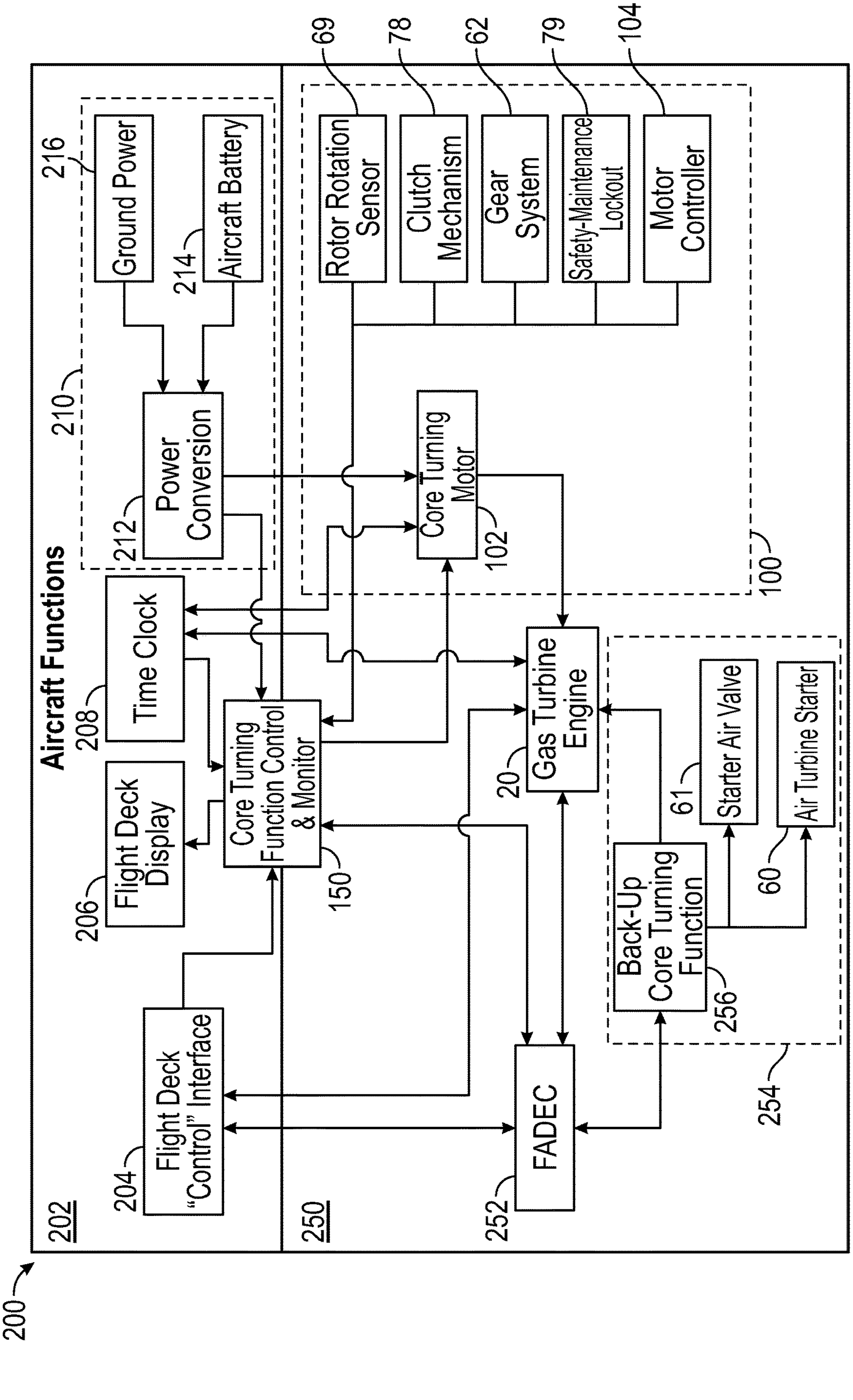
FIG. 3 is a block diagram depicting an aircraft system including a bowed rotor prevention system according to a non-limiting embodiment of the present disclosure.

Turning now to FIG. 3, a block diagram depicts an aircraft system 200 according to a non-limiting embodiment. The aircraft system 200 includes various aircraft sub-systems 202 and an engine system 250. The aircraft sub-systems 202 include a flight control interface 204, a flight deck graphical user interface (GUI) 206, a time clock unit 208, and a power distribution system 210.

The flight deck control interface 204 and GUI 206 operate together to facilitate control of the bowed rotor prevention system 100 (e.g., the core turning controller 150) along with other aircraft systems. The flight deck interface 204 and flight deck display 206 provide for various instrumentations and gauges for monitoring the core turning system as well as provide an interface for activating or deactivating the core turning system. The operating modes include, but are not limited to, a maintenance mode, an engine start-up mode, and an anti-rotor bowing mode.

The time clock unit 208 can provide the time duration and time intervals of aircraft operation. In one or more non-limiting embodiments, the time clock unit 208 can monitor the time during which an aircraft operating mode operates and/or the time duration during which one or more particular components are active or operate. For example, when invoking the anti-rotor bowing mode, the time clock unit 208 input is used by the core turning controller 150 to monitor the time duration at which the rotor is halted in a given position before being rotated into a new position. In one or more embodiments, the time clock unit 208 provides input to the core turning controller. Although the time clock unit 208 is shown as a separate individual unit, it should be appreciated that it can be implemented along with other units (e.g., the core turning controller 150) without departing from the scope of the present disclosure.

The time clock unit 208 is in signal communication with the core turning controller 150. Accordingly, the core turning controller 150 can monitor the motoring time and output a timing signal indicative of the motoring time. In this manner, the core turning controller 150 can deactivate the motor 102 in response to the timing signal indicating that the motoring time is expired.

The time clock unit 208 also monitors the operating time of the gas turbine engine 20 and/or the operating time of the bowed rotor prevention system 100. For example, the time clock unit 208 can monitor the amount of time the gas turbine engine 20 is actively operating (e.g., in a non-idle mode) and/or the amount of time the gas turbine engine 20 is switched off. In one or more embodiments, the operating time can be output from the time clock unit 208 to the core turning controller 150. In this manner, the core turning controller 150 can determine the amount of time the gas turbine engine 20 is actively operating (e.g., in a non-idle mode) and/or the amount of time the gas turbine engine 20 is switched off.

The power distribution system 210 provides power to the various aircraft sub-systems 202 and the engine system 250. The power distribution system 210 includes a power conversion unit 212, and a battery system 214. The power conversion unit 212 can include an aircraft generator, an AC-to-DC converter, and a DC-to-DC converter. The aircraft generator can include a turbo generator, for example, which converts mechanical power into alternating current (AC) power. The AC-to-DC converter converts AC power into direct current (DC) power. The DC-to-DC converter converts a first DC power into a second DC power, e.g., steps up (i.e., increases) an input DC voltage or steps down (decreases) an input DC voltage.

The engine system 250 includes a gas turbine engine 20, an aircraft controller 252, a bowed rotor prevention system 100, a backup rotor turning system 254, and a core turning controller 150. In one or more non-limiting embodiments, the core turning controller 150 can be implemented to provide a communication interface between the aircraft system 200 and the engine system 250.

The aircraft system 200 is in signal communication with one or more of the aircraft sub-systems 202. As described herein, the gas turbine engine 200 includes a rotor that is mechanically coupled to the bowed rotor prevention system 100. The gas turbine engine 20 and its arrangement with the bowed rotor prevention system 100 is described in detail above and will not be repeated for the sake of brevity.

The aircraft controller 252 can include a full authority digital engine control (FADEC), for example, which can control various operations of the aircraft system 200 and the engine system 250. The aircraft controller 252 is in signal communication with the gas turbine engine 20, the flight deck control interface 204, the backup rotor turning system 254, and the core turning controller 150. According to a non-limiting embodiment, the aircraft controller 252 can combines throttle, prop, and mixture controls into a single control. In one more non-limiting embodiment, the FADEC can process one or more onboard models along with various measured aircraft operating parameters to actively control throttle settings at different altitudes to optimize power/prop RPM/mixture operations.

The core turning controller 150 can invoke an anti-rotor bowing mode of the bowed rotor prevention system 100. In one or more non-limiting embodiments, the anti-rotor bowing mode is invoked in response to a command received from the flight deck control interface 204. In one or more non-limiting embodiments, the core turning controller 150 monitors and controls the bowed rotor prevention system 100 to ensure: rotor turning is performed without any faults, e.g., core turning motor (CTM) failures; minimizes energy use to turn the rotor; and successfully removes, or completely prevents rotor bowing.

The core turning controller 150 can be implemented in an individual line-replaceable unit, within a control system (e.g., in an electronic engine control), and/or distributed between multiple electronic systems. Although the core turning controller 150 is illustrated as a separate controller, one or more non-limiting embodiments of the present disclosure implements the core turning controller 150 with the aircraft controller 252.

The core turning controller 150 may include memory to store instructions that are executed by a processor. The executable instructions may be stored or organized in any manner and at any level of abstraction. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form.

According to one or more non-limiting embodiments, the memory of the core turning controller 150 can store a lookup table (LUT) that maps an engine operating time to a pre-stored motoring time. The pre-stored motoring time is a time previously determined as an amount of time that successfully removes a thermal bow from the rotor after the engine has been operating for known amount of time. Accordingly, the core turning controller 150 can determine the amount of time the engine has operated (e.g., based on the engine operating time provided by the time clock unit 208), and compare the engine operating time to the LUT to determine the motoring time needed to remove a thermal bow from the rotor.

In response to invoking the anti-rotor bowing mode, the core turning controller 150 can perform one of a first anti-bowing technique to prevent the rotor bow from forming in the rotor or a second anti-bowing technique that removes the rotor bow present in the rotor. According to a non-limiting embodiment, the first anti-bowing technique involves the core turning controller 150 operating to determine the engine operating time, and based on the engine operating time determines a motoring time that will successfully prevent any thermal bowing in the rotor. In one or more non-limiting embodiments, the core turning controller 150 compares the engine operating time to a time threshold. When the engine operating time is less than or equal to the time threshold, the core turning controller 150 determines that a thermal bow has not formed and therefore deactivates the anti-motoring mode.

When, however, the engine operating time exceeds the time threshold, the core turning controller 150 proceeds to determine a motoring time based on the engine operating time, and activates the motor controller 104. Accordingly, the motor controller 104 drives the core turning motor 104 for the duration of the motoring time. Once the motoring time expires, the core turning controller 150 deactivates the motor controller 104 such that turning of the rotor is stopped, and then deactivates the anti-motoring mode. Accordingly, the engine controller 252 can proceed to initiate engine startup using the air turbine starter 60 and starter air valve 61, while thermal bowing is removed from the rotor.

In one or more non-limiting embodiments, the core turning controller 150 can perform the second anti-bowing technique in response to determining an incomplete anti-rotor bowing operation when the anti-rotor bowing mode and/or the core turning motor 102 is deactivated before the motoring time expires. In response to detecting the incomplete anti-rotor bowing operation, the time clock unit 208 begins monitoring motoring down-time, i.e., the duration of time at which the anti-rotor bowing mode and/or the core turning motor 102 is deactivated. Once the anti-rotor bowing mode and/or the core turning motor 102 is re-activated, the core turning controller 150 obtains the total down-time from the time clock unit 208, calculates a new amount of bow occurring in the rotor during the motoring down-town, and calculates a new motoring time at which to motor the rotor to remove the new bow in the rotor. Accordingly, the core turning controller 150 can either reactivate the anti-rotor bowing mode to operate the core turning motor 102 according to the new motoring time to remove the bow formed in the rotor, or can activate the backup rotor turning system 254 and rotate the rotor according to the new motoring time to remove the bow formed in the rotor.

In one or more non-limiting embodiments, the core turning controller 150 can also proactively activate or deactivate the bowed rotor prevention system 100 in response to detecting activation of various aircraft operating modes. For example, the core turning controller 150 can deactivate operation of the bowed rotor prevention system 100 or prevent the bowed rotor prevention system 100 from invoking the anti-rotor bowing mode and thus the core turning motor 102 in response to receiving a request to invoke the maintenance operation mode 79 to prevent activation of the core turning motor 102 while aircraft maintenance operations are performed.

The backup rotor turning system 254 can be invoked and utilized when the core turning controller 150 detects one or more faults with the bowed rotor control system 100. The backup rotor turning system 254 is coupled to the air turbine starter assembly 60, along with a starter air valve 61, and can utilize control logic 256 to control the gas turbine engine 20 and the starter system 60. When, for example, the core turning controller 150 detects a fault with one or more of the rotation sensors 69, the clutch 78, the gear system 62, a rotation fault as indicated by the rotor signal from the rotation sensor 69, etc., the core turning controller 150 can deactivate the bowed rotor control system 100 and activate the backup rotor turning system 254. Accordingly, the backup rotor turning system 254 can initiate a backup core turning function 256, which turns the rotor at a constant rotation and fixed speed for a motoring time that ensures the thermal bowing is removed. According to a non-limiting embodiment, the core turning controller 150 can calculate a new amount of bow occurring in the rotor during a motoring down-town caused by the fault, and calculates a new motoring time at which to motor the rotor to remove the new bow, and invokes the backup rotor turning system 254 so as to motor the rotor according to the new motoring time. Once thermal bowing is removed (i.e., the motoring time expires), the air turbine starter assembly 60 and starter air valve 61 can be activated and operate together to convert pneumatic (air) energy to mechanical torque, which advances rotation of the gas turbine engine 20 until it reaches ignition speed.

According to a non-limiting embodiment, the core turning controller 150 can determine the amount of time during which the bowed rotor prevention system 100 is deactivated (e.g., based on the time monitored by the time clock unit) or interrupted, e.g., to perform a maintenance operation. When the deactivation time of the bowed rotor prevention system 100 exceeds a threshold time, the core turning controller 150 can predict an amount of thermal bow that may occur during the deactivation time and determine an amount of motoring time necessary to remove the bow. Accordingly, the core turning controller 150 can inform the engine controller 252 to invoke the backup rotor turning system 254 for the amount of time necessary to remove the thermal bow that may have occurred during the time at which the bowed rotor prevention system 100 was deactivated.

Figure 4:
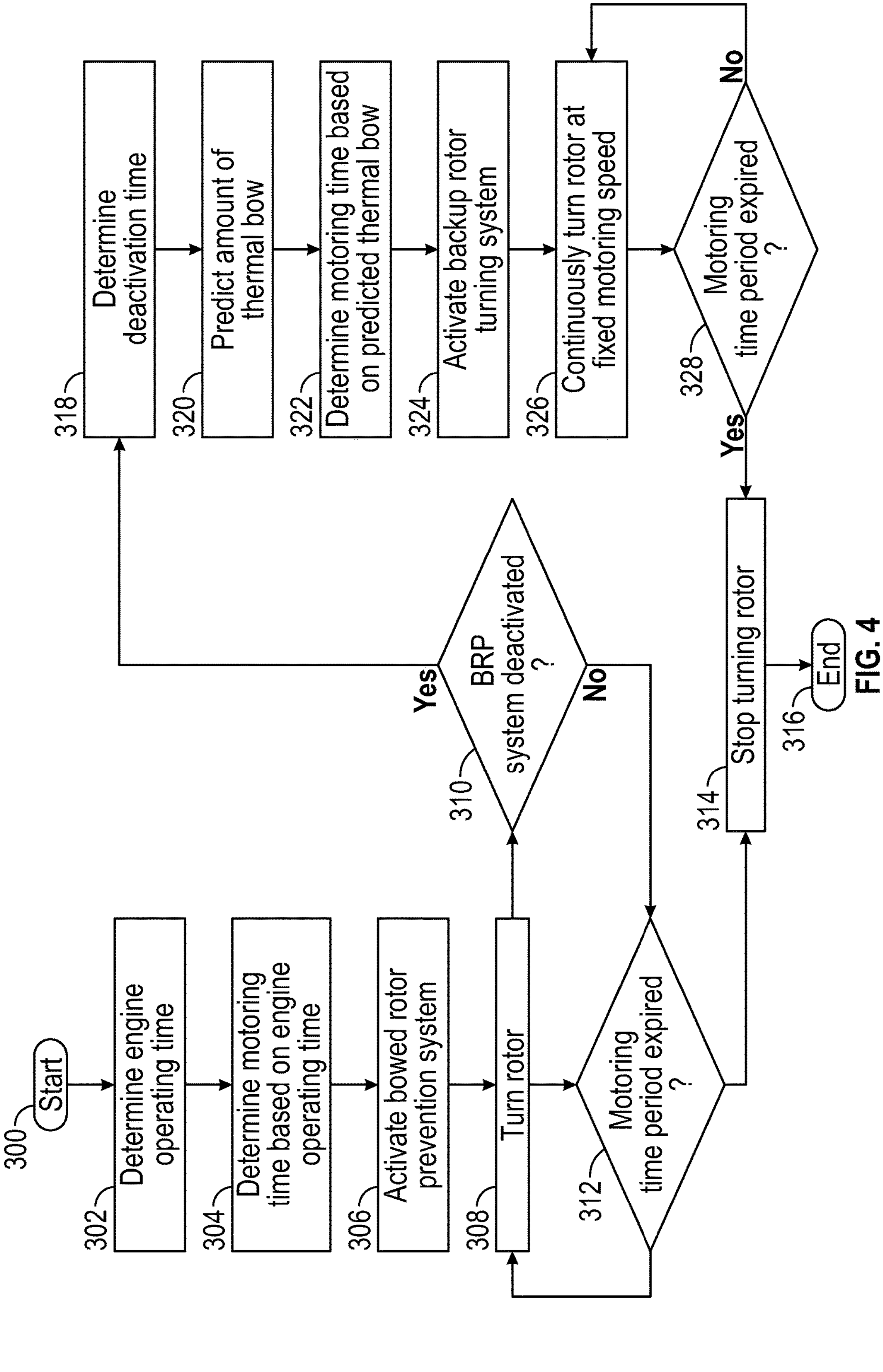
FIG. 4 is a flow diagram illustrating a method of removing thermal bowing in an aircraft rotor according to a non-limiting embodiment of the present disclosure.

Turning now to FIG. 4, a method of removing thermal bowing in an aircraft rotor is illustrated according to a non-limiting embodiment of the present disclosure. The method begins at operation 300, and at operation 302 an engine operating time is determine. At operation 304, a motoring time for removing a thermal bow from a rotor is determined based on the engine operating time. At operation 306, a bowed rotor prevention (BRP) system is activated and the rotor is turned. When no faults exists, the bowed rotor prevention system is activated at operation 306 and the rotor is turned at operation 308. At operation 310, a determination is made as to whether the bowed rotor prevention system is deactivated or interrupted. The deactivation or interruption of the bowed rotor prevention system can be determined when the core turning motor is deactivated before the motoring time has expired. When the bowed rotor prevention system is not deactivated or not interrupted, the method determines whether the motoring time has expired is performed at operation 312. When the motoring time has not expired, the method returns to operation 308 and continues turning the rotor. When, however, the motoring time has expired, turning of the rotor is stopped at operation 314, and the method ends at operation 316.

When it is determined that the bowed rotor prevention system is deactivated or interrupted at operation 310, the method proceeds to operation 318 and determines the time at which the bowed rotor prevention system is deactivated. At operation 320 a predicted amount of thermal bow to have occurred during deactivation of the bowed rotor prevention system is determined, and a motoring time based on the predicted amount of thermal bow is determined at operation 322. At operation 324, the backup rotor turning system is activated at operation 324, and the rotor is continuously turned. At operation 328, a determination is made as to whether the motoring time has expired. When the motoring time has not expired, the method returns to operation 326 and continues turning the rotor. When, however, the motoring time has expired, turning of the rotor is stopped at operation 314, and the method ends at operation 316.

As describe herein, a bowed rotor prevention system is provided according to one or more non-limiting embodiments of the present disclosure. According to various non-limiting embodiments, the bowed rotor prevention system configured is to optimally remove, or even fully prevent, rotor bow that can occur in a gas turbine engine. The bowed rotor prevention system includes a core turning controller, which can operate in a first mode to determine an operating time of the engine to determine a motoring time based on the engine operating, and a second mode to determine a motoring time needed to motor (e.g., turn) the rotor so the bow is prevented from forming based on the engine operating time. In addition, the core turning controller can determine a subsequent engine shut down time, determine an amount of bow present in the rotor based on the engine operating time and the subsequent engine shut down time, and determine a motoring time indicative of an amount of time needed to motor (e.g., turn) the rotor so that the bow is removed. Based on the motoring time, the core turning controller can activate a motor controller that drives a core turning motor to turn the rotor for the duration of the motoring time. In this manner, it can be ensured that a thermal bow is removed the rotor, or even prevented from forming following operation of the engine. Once the motoring time expires, the motor can be deactivated and engine startup can be initiated.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bowed rotor prevention system comprises:

a gas turbine engine including a rotor that is rotatably coupled to a drive shaft;

an electric motor rotatably coupled to a motor shaft, the motor shaft mechanically coupled to the drive shaft so as to rotate therewith; and core turning controller in signal communication with the electric motor, the core turning controller configured to determine whether a rotor bow is present in the rotor based on an operating time of the gas turbine engine, to determine a motoring time based on the operating time, and to invoke an anti-rotor bowing mode configured to control the electric motor to rotate the rotor according to the motor time, wherein the core turning controller divides a full rotation of the rotor into a number of equal steps and controls the motor such that it rotates the rotor through an alternating series of rotations and pauses over the full rotation.

2. The bowed rotor prevention system of claim 1, wherein in response to invoking the anti-rotor bowing mode, the core turning controller is configured to perform one of a first anti-bowing technique to prevent the rotor bow from forming in the rotor, or a second anti-bowing technique that removes the rotor bow present in the rotor.

3. The bowed rotor prevention system of claim 2, wherein the first anti-bowing technique includes determining a most recent operating time of the gas turbine engine, and calculating the motoring time which is indicative of an amount of time during which the rotor is rotated to prevent the rotor bow from forming.

4. The bowed rotor prevention system of claim 3, further comprising a time clock unit in signal communication with the core turning controller and configured to monitor the motoring time and to output a timing signal indicative of the motoring time.

5. The bowed rotor prevention system of claim 4, wherein the core turning controller is configured to deactivate the electric motor in response to the timing signal indicating that the motoring time is expired.

6. The bowed rotor prevention system of claim 5, wherein the core turning controller initiates engine startup of the gas turbine engine in response to determining the motoring time is expired.

7. The bowed rotor prevention system of claim 2, wherein the core turning controller performs the second anti-bowing technique in response to a deactivation of the core turning motor before the motoring time expires.

8. The bowed rotor prevention system of claim 7, wherein the second anti-bowing technique includes calculating, by the core turning controller, an additional amount of rotor bow that forms in the rotor during a motoring down-time caused by the incomplete anti-rotor bowing operation, and calculates a new motoring time at which to motor the rotor to remove the bow having the additional amount of rotor bow.

9. The bowed rotor prevention system of claim 8, wherein the core turning controller detects a fault in the anti-rotor bowing mode, and invokes a backup rotor turning system to remove the bow having the additional amount of rotor bow.

10. The bowed rotor prevention system of claim 9, wherein the backup rotor turning system is configured to rotate the rotor at a constant rotation according to the new motoring time to remove the bow having the additional amount of rotor bow.

11. A method of operating a rotor of an aircraft, the method comprising:

rotating a rotor of a gas turbine engine;

rotating a motor shaft using an electric motor, the motor shaft coupled to a drive shaft of the rotor such that rotating the motor shaft rotates the rotor; and determining, by a core turning controller, whether a rotor bow is present in the rotor based on an operating time of the gas turbine engine;

determining, by the core turning controller, a motoring time based on the operating time; and invoking, by the core turning controller, an anti-rotor bowing mode configured to control the electric motor to rotate the rotor according to the motor time, wherein in response to invoking the anti-rotor bowing mode, the core turning controller is configured to perform one of a first anti-bowing technique to prevent the rotor bow from forming in the rotor, or a second anti-bowing technique that removes the rotor bow present in the rotor, and wherein the first anti-bowing technique further comprises:

dividing, by the core turning controller, a full rotation of the rotor into a number of equal steps; and controlling the motor such that it rotates the rotor through an alternating series of rotations and pauses over the full rotation.

12. The method of claim 11, wherein the first anti-bowing technique further comprises:

determining, by the core turning controller, a most recent operating time of the gas turbine engine; and calculating, by the core turning controller, the motoring time which is indicative of an amount of time during which the rotor is rotated to prevent the rotor bow from forming.

13. The method of claim 12, further comprising monitoring, by a time clock unit, the motoring time and to output a timing signal indicative of the motoring time.

14. The method of claim 13, further comprising deactivating the electric motor in response to the timing signal indicating that the motoring time is expired.

15. The method of claim 14, further comprising initiating engine startup of the gas turbine engine in response to determining the motoring time is expired.

16. The method of claim 11, wherein the core turning controller performs the second anti-bowing technique in response to a deactivation of the core turning motor before the motoring time expires, the second anti-bowing technique comprising:

calculating, by the core turning controller, an additional amount of rotor bow that forms in the rotor during a motoring down-time caused by the incomplete anti-rotor bowing operation; and calculating, by the core turning controller, a new motoring time at which to motor the rotor to remove the bow having the additional amount of rotor bow.

17. The method of claim 16, further comprising:

detecting, by the core turning controller, a fault in the anti-rotor bowing mode; invoking a backup rotor turning system; and rotating, by the backup rotor turning system, the rotor at a constant rotation according to the new motoring time to remove the bow having the additional amount of rotor bow.

* * * * *